(No Model.)

C. HEDGES.
ICE CREAM FREEZER.

No. 347,600. Patented Aug. 17, 1886.

WITNESSES:
Donn Twitchell,
C. Sedgwick

INVENTOR:
C. Hedges
BY Munn & Co
ATTORNEYS.

UNITED STATES PATENT OFFICE.

CHARLES HEDGES, OF GRINNELL, IOWA.

ICE-CREAM FREEZER.

SPECIFICATION forming part of Letters Patent No. 347,600, dated August 17, 1886.

Application filed June 9, 1886. Serial No. 204,616. (No model.)

*To all whom it may concern:*

Be it known that I, CHARLES HEDGES, of Grinnell, in the county of Poweshiek and State of Iowa, have invented a new and Improved Ice-Cream Freezer, of which the following is a full, clear, and exact description.

My invention relates to a wagon or vehicle adapted to carry ice-cream in freezers for delivery to customers at the same time with milk or produce.

The invention consists in a vehicle, ice-cream freezers carried thereby, and mechanism driven from the vehicle wheel or axle for operating the freezer mechanism as the vehicle travels along the road and without attention of the driver.

The invention includes also certain novel features of construction and combinations of parts of the freezer mechanism, all as hereinafter fully described and claimed.

Reference is to be had to the accompanying drawings, forming a part of this specification, in which similar letters of reference indicate corresponding parts in both the figures.

Figure 1:
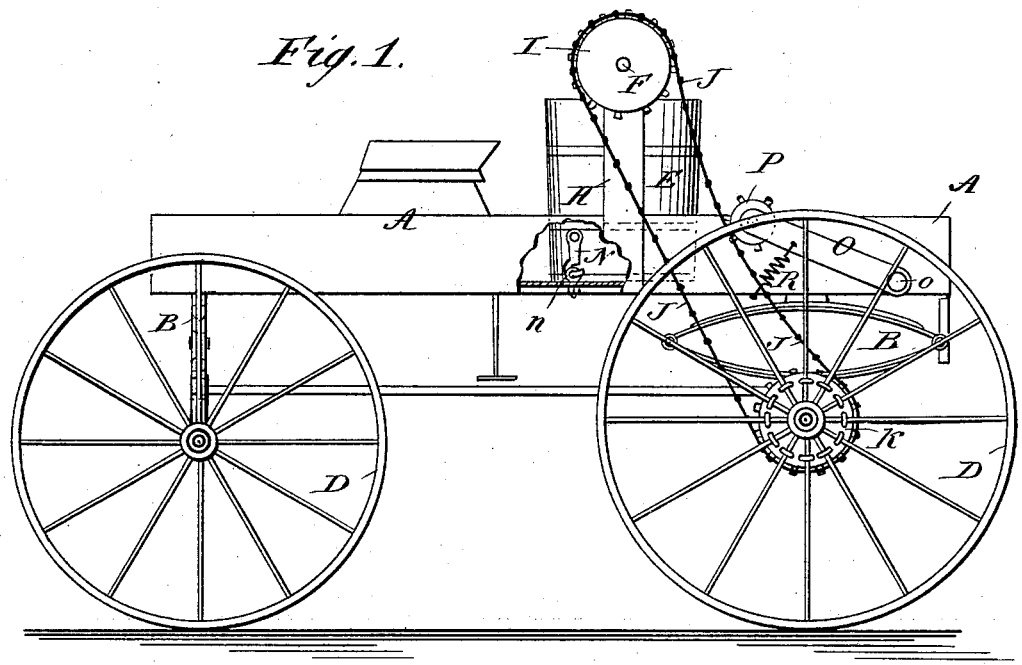
Figure 2:
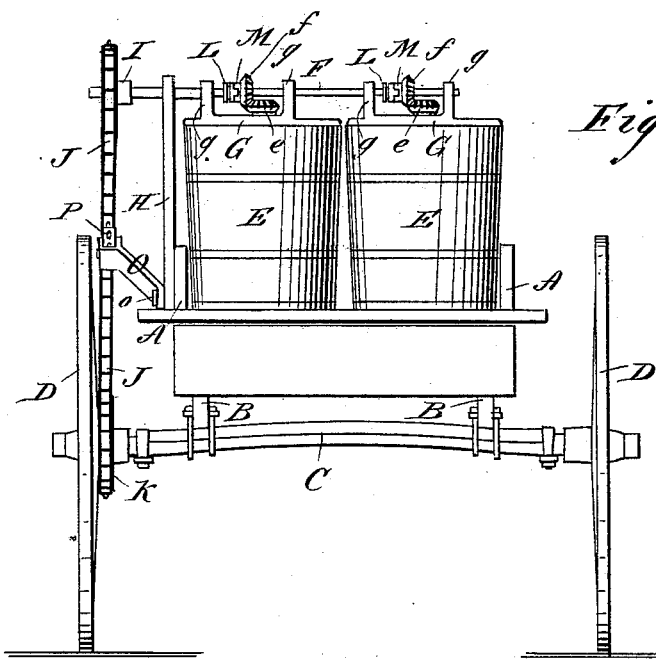

Figure 1 is a side elevation of my improved ice-cream wagon, partly broken away, and Fig. 2 is a rear view thereof.

The wagon-body A is supported by springs B from axles C, on which the wheels D are placed.

The wagon-body and running-gear may have any approved construction; but I propose to have the body large enough to carry a supply of milk for delivery to customers along with ice-cream freezers E.

The milk-cans are not shown in the drawings, but they will be placed anywhere in the wagon in front of and behind the ice-cream freezers.

The drawings show two ice-cream freezers, E E, which may have any suitable construction with ordinary ice-holding tubs, in which are placed the cream-cans having rotative beaters or dashers, to the shafts of which the bevel-pinions *e e* are fixed. These pinions *e e* mesh with bevel-pinions *f f*, which are placed loosely on a shaft, F, which is journaled in bearings *g*, fixed to the covers G of the freezers, and in a standard, H, fixed to the wagon-body. The shaft F projects at one side of the wagon and carries fixedly a chain-wheel, I, from which a chain, J, passes to and around a chain-wheel, K, fixed in any approved way to one of the wheels D of the wagon, and whereby power may be transmitted from the wheel to rotate the shaft F and operate the dashers in the cream-cans when a clutch, L, splined to the shaft F, is thrown by any suitably-arranged lever into gear with a clutch, M, fixed to the pinion *f*.

It will be understood that any system of gearing arranged to operate a dasher in the cream-can and also to stir the ice surrounding the can or to rotate the can bodily in the ice may be employed and be operated by gearing connected to the shaft F, as the special construction of the freezer forms no part of my invention. Hooks N, attached to the freezers, may be engaged with eyes *n*, fixed to the wagon-body, for holding the freezers securely in place in the wagon, to insure the proper operation of the mechanism of the freezers.

To the wagon-body A there is pivoted at *o* one end of an arm, O, to the other end of which there is journaled a wheel, P, which bears on the driving-chain J and takes up any undue slackness of the chain; hence the chain will always be stretched tightly at its going or driving side, irrespective of the different positions of the wagon-body, due to greater or lesser loads on it and the condition of the road over which the wagon travels. I prefer to employ a spring, R, fixed at one end to the wagon-body and at the other end to the arm O of the belt-tightener, to make the action of the tightener more effective.

It is evident that with a wagon, ice-cream freezers, and driving gearing arranged as above described, the cream may be kept in excellent condition by the operation of the freezer mechanism from the wagon-wheel and without expense or manual labor, and the cream may be delivered at the same time as the milk which may be carried in the wagon, and as the sale of milk is quite universal an opportunity is given for the sale of ice-cream to the same customers, and without the cost and labor of delivering the cream alone or from a separate vehicle.

As above stated, the freezers may have various constructions. For instance, three or more separate cans containing cream of different flavors may be placed in one ice-tub, and the mechanism of all the cans may be operated from the shaft F by suitably-connected gearing.

In vehicles whose axles revolve with the wheels the driving-wheel or pulley K may be fixed to the axle instead of to the wheel, as will readily be understood.

Having thus described my invention, what I claim as new, and desire to secure by Letters Patent, is—

1. In combination, a wheeled vehicle, an ice-cream freezer carried thereby, and mechanism driven from the vehicle wheel or axle and operating the mechanism of the freezer, substantially as described, for the purposes set forth.

2. The combination of the wagon-body A, one or more ice-cream freezers, E, thereon, a shaft, F, a wheel, I, thereon, a driving chain or belt, J, a wheel, K, fixed to one of the wagon-wheels or to the axle, and gearing connecting the shaft F with the mechanism of the freezers, substantially as described, for the purposes set forth.

3. The combination of the wagon-body A, one or more ice-cream freezers, E, thereon, a shaft, F, a wheel, I, thereon, a driving chain or belt, J, a wheel, K, on one of the wagon-wheels or on the axle, driving-gearing connecting shaft F with the mechanism of the freezers, and clutches arranged with the driving mechanism, substantially as described, for the purposes set forth.

4. The combination, with the wagon-body A, one or more ice-cream freezers carried thereby, a shaft, F, drive-wheels I K, and belt J, of a belt-tightener, O P, substantially as described, for the purposes set forth.

CHARLES HEDGES.

Witnesses:
CHS. H. SPENCER,
H. C. SPENCER.